(12) United States Patent
Razzell et al.

(10) Patent No.: US 11,286,792 B2
(45) Date of Patent: Mar. 29, 2022

(54) CERAMIC MATRIX COMPOSITE VANE WITH COOLING HOLES AND METHODS OF MAKING THE SAME

(71) Applicant: Rolls-Royce plc, London (GB)

(72) Inventors: Anthony Razzell, London (GB); Michael J. Whittle, London (GB); Ian M. Edmonds, London (GB)

(73) Assignee: Rolls-Royce plc

( * ) Notice: Subject to any disclaimer, the term of this patent is extended or adjusted under 35 U.S.C. 154(b) by 276 days.

(21) Appl. No.: 16/526,274

(22) Filed: Jul. 30, 2019

(65) Prior Publication Data

US 2021/0032995 A1 Feb. 4, 2021

(51) Int. Cl.
F01D 5/18 (2006.01)
C04B 35/80 (2006.01)
F01D 5/28 (2006.01)

(52) U.S. Cl.
CPC ............. F01D 5/187 (2013.01); C04B 35/80 (2013.01); F01D 5/284 (2013.01); F05D 2220/32 (2013.01); F05D 2230/20 (2013.01); F05D 2300/6033 (2013.01)

(58) Field of Classification Search
CPC .... F01D 5/183; F01D 5/186–189; F01D 5/20; F01D 5/284; F01D 5/288; B23B 2603/00; F05D 2230/90; B05D 1/32; B05B 12/26
See application file for complete search history.

(56) References Cited

U.S. PATENT DOCUMENTS

| 5,916,510 | A | 6/1999 | Jessen | |
|---|---|---|---|---|
| 6,113,722 | A * | 9/2000 | Hoffman | B81C 99/0085 156/155 |
| 6,197,424 | B1 * | 3/2001 | Morrison | F01D 11/12 428/402 |
| 6,273,678 | B1 * | 8/2001 | Darolia | F01D 5/286 415/200 |
| 6,408,610 | B1 * | 6/2002 | Caldwell | C23C 14/046 29/889.2 |
| 6,441,341 | B1 * | 8/2002 | Steibel | B23K 26/40 219/121.71 |
| 7,247,003 | B2 * | 7/2007 | Burke | F01D 5/147 416/229 R |
| 7,658,590 | B1 * | 2/2010 | Spanks | B82Y 30/00 415/115 |
| 7,754,126 | B2 | 7/2010 | Subramanian et al. | |
| 7,887,300 | B2 * | 2/2011 | Mazzola | F01D 5/147 416/241 B |

(Continued)

FOREIGN PATENT DOCUMENTS

EP 1507957 B1 * 8/2005 ............. F01D 5/188
JP 2008121561 A * 5/2008 ............. F01D 5/186

*Primary Examiner* — Topaz L. Elliott
(74) *Attorney, Agent, or Firm* — Barnes & Thornburg LLP (57) ABSTRACT

An airfoil for a gas turbine engine is made from ceramic matrix composite materials. The airfoil has an inner surface that defines a cooling cavity in the body and an outer surface that defines a leading edge, a trailing edge, a pressure side, and a suction side of the body. The airfoil is formed with a hollow tube that extends through the body to define a cooling passage that extends from the cooling cavity through the airfoil to provide fluid communication between the cooling cavity and a gas path environment surrounding the airfoil.

7 Claims, 6 Drawing Sheets

(56) References Cited

U.S. PATENT DOCUMENTS

| | | | |
|---|---|---|---|
| 9,797,263 B2* | 10/2017 | Varney | B23K 26/389 |
| 10,017,425 B2 | 7/2018 | Tuertscher et al. | |
| 10,024,175 B2 | 7/2018 | Varney | |
| 10,472,972 B2* | 11/2019 | Bunker | C23C 28/345 |
| 10,539,026 B2* | 1/2020 | Xu | F01D 5/186 |
| 10,578,115 B2* | 3/2020 | Lander | F01D 5/282 |
| 10,717,101 B2* | 7/2020 | Henson | B05D 1/32 |
| 10,731,469 B2* | 8/2020 | Xu | F01D 5/147 |
| 2002/0076541 A1* | 6/2002 | Jarmon | F01D 5/186 |
| | | | 428/312.6 |
| 2008/0203236 A1* | 8/2008 | Mazzola | F01D 5/18 |
| | | | 244/35 R |
| 2014/0271131 A1* | 9/2014 | Moody | F01D 5/186 |
| | | | 415/116 |
| 2016/0089692 A1 | 3/2016 | Reid et al. | |
| 2016/0348511 A1* | 12/2016 | Varney | C04B 38/065 |
| 2016/0348515 A1* | 12/2016 | Varney | C04B 35/16 |
| 2017/0152749 A1* | 6/2017 | Bunker | F01D 9/065 |
| 2017/0159488 A1* | 6/2017 | Kottilingam | F01D 5/288 |
| 2017/0335856 A1* | 11/2017 | Lander | F04D 29/388 |
| 2017/0368647 A1* | 12/2017 | Bunker | B23P 6/045 |
| 2018/0281006 A1* | 10/2018 | Coskun | B25J 15/0019 |
| 2019/0255550 A1* | 8/2019 | Henson | F01D 5/288 |
| 2020/0080425 A1* | 3/2020 | Weaver | B28B 23/0006 |

\* cited by examiner

CERAMIC MATRIX COMPOSITE VANE WITH COOLING HOLES AND METHODS OF MAKING THE SAME

FIELD OF THE DISCLOSURE

The present disclosure relates generally to airfoils used in gas turbine engines, and more specifically to airfoils used in gas turbine engines that contain composite materials.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Products of the combustion reaction directed into the turbine flow over airfoils included in stationary vanes and rotating blades of the turbine. The interaction of combustion products with the airfoils heats the airfoils and supporting structures to temperatures that require the airfoils and supporting structures to be made from high-temperature resistant materials and/or to be actively cooled by supplying relatively cool air to the vanes and blades. To this end, some composite materials adapted to withstand very high temperatures are being incorporated into vane and blade design. Design and manufacture of vanes and blades including composite components presents challenges.

SUMMARY

The present disclosure may comprise one or more of the following features and combinations thereof.

According to a first aspect of the present disclosure, an airfoil for use in a gas turbine engine includes an airfoil shaped ceramic matrix composite body, and a hollow tube embedded in the body. The airfoil shaped ceramic matrix composite body has an inner surface that defines a cooling cavity in the body and an outer surface that defines a leading edge, a trailing edge, a pressure side, and a suction side of the body. The hollow tube is made from an environmental barrier material and extends through the body between the inner surface and the outer surface to provide fluid communication between the cooling cavity and a gas path environment surrounding the outside surface.

In some embodiments, the body includes a plurality of fibers and matrix material infiltrated with the fibers and the tube is embedded in the plurality of fibers such that the plurality of fibers are parted around the tube to avoid fracturing the plurality of fibers.

In some embodiments, the body extends along an axis, the airfoil further includes a plurality of tubes made from the environmental barrier material, the plurality of tubes includes the first tube, and the plurality of tubes are spaced apart from one another axially relative to the axis. In some embodiments, the environmental barrier material is different than a material of the ceramic reinforcement fiber preform and the ceramic matrix material.

In some embodiments, the tube defines a cooling passageway and has a length that extends between a first end of the tube and a second end of the tube and a cross-sectional area of the passageway varies along the length of the tube. In some embodiments, the tube defines a cooling passageway and has a length that extends between a first end of the tube and a second end of the tube and a cross-sectional area of the passageway is constant along the length of the tube.

In some embodiments, the tube is conical such that the cross-sectional area of the passageway narrows from the first end to the second end. The cross-sectional area of the passageway may vary constantly along the length of the tube. The cross-sectional area of the passageway may vary exponentially along the length of the tube. In some embodiments, the tube has a non-circular cross section when viewed along an axis that extends between the first end and the second end.

In some embodiments, the cooling passage extends between the cooling cavity and the pressure side of the airfoil near the trailing edge. The tube may be made entirely of environmental barrier material. The tube may be self-supporting such that it is embedded into the fibers on its own.

According to another aspect of the present disclosure, a method of forming an airfoil includes: providing an airfoil shaped ceramic reinforcement fiber preform and a tube, the ceramic reinforcement fiber preform having a first side formed to define a cooling cavity in the ceramic reinforcement fiber preform and a second side opposite the first side, the tube being made from an environmental barrier material and having a first end and a second end. The method further includes inserting the tube through the ceramic reinforcement fiber preform so that the first end of the tube extends into the cooling cavity and the second end of the tube extends beyond the second side of the ceramic reinforcement fiber preform.

In some embodiments, the method further includes infiltrating the ceramic reinforcement fiber preform with ceramic matrix material to densify the ceramic reinforcement fiber preform and form a ceramic matrix composite airfoil having the tube fixed therein, the ceramic matrix composite airfoil having an inner surface that defines the cooling cavity and an outer surface opposite the inner surface and adapted to interface with hot gases. The method further includes removing material from the first end and the second end of the tube such that the first end is about flush with the inner surface and the second end is about flush with the outer surface to form a cooling passage with the tube that extends through the ceramic matrix composite airfoil to provide fluid communication between the cooling cavity and environment surrounding the outer surface outside of the ceramic matrix composite airfoil.

In some embodiments, the tube has a hollow section and the tube includes removable filler material present in the hollow section during the step of infiltrating to block ingress of ceramic matrix material into the hollow section.

In some embodiments, the removable filler material includes a first plug located in the first end of the tube during the infiltrating step, a second plug located in the second end of the tube during the infiltrating step, and the step of removing material from the first end and the second end includes removing the first plug and the second plug.

In some embodiments, the tube has a hollow section and wherein the first end is made of solid material to block access into the hollow section and the second end is made of solid material to block access into the hollow section during the infiltrating step.

In some embodiments, the step of removing material from the first end and the second end includes cutting the first end from the tube to form a first opening into the hollow section and cutting the second end from the tube to form a second opening into the hollow section.

In some embodiments, the tube includes an inner surface that directly defines the cooling passage and an outer surface that directly engages the ceramic matrix composite airfoil and the environmental barrier material extends between the inner surface and the outer surface of the tube.

In some embodiments, the step of inserting the tube through the ceramic reinforcement fiber preform includes parting fibers included in the ceramic reinforcement fiber preform around the tube to avoid fracturing the fibers.

These and other features of the present disclosure will become more apparent from the following description of the illustrative embodiments.

BRIEF DESCRIPTION OF THE DRAWINGS

FIGS. 11A-11E show various cross-sections of tubes that may be used to provide cooling passageways in an airfoil;

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
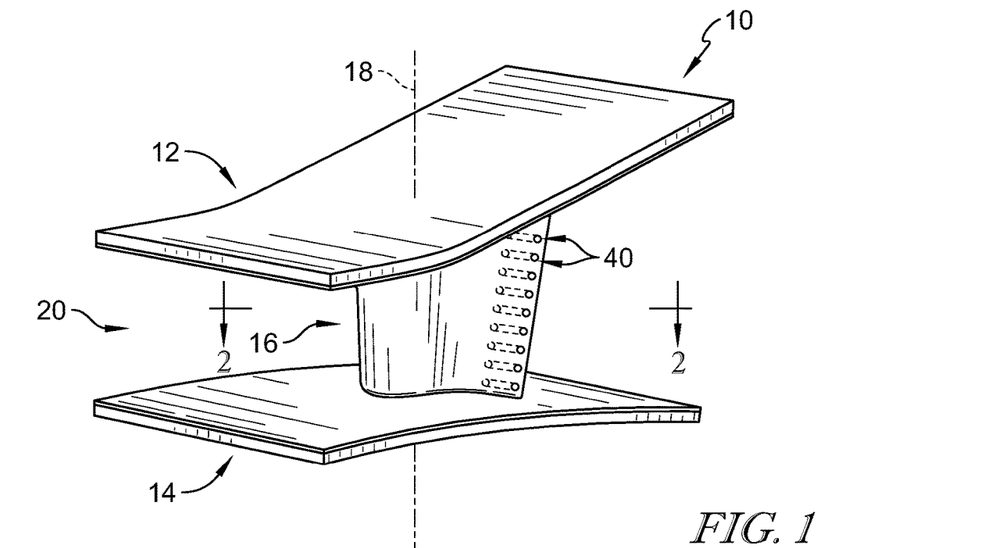
FIG. 1 is perspective view of a nozzle guide vane adapted for use in a gas turbine engine, the nozzle guide vane including an outer endwall, an inner endwall, and an airfoil extending generally along an axis between the outer endwall and the inner endwall, the airfoil made from ceramic matrix composite materials and formed with a plurality of cooling passageways that extend through a trailing edge of the airfoil to cool the trailing edge.
Figure 2:
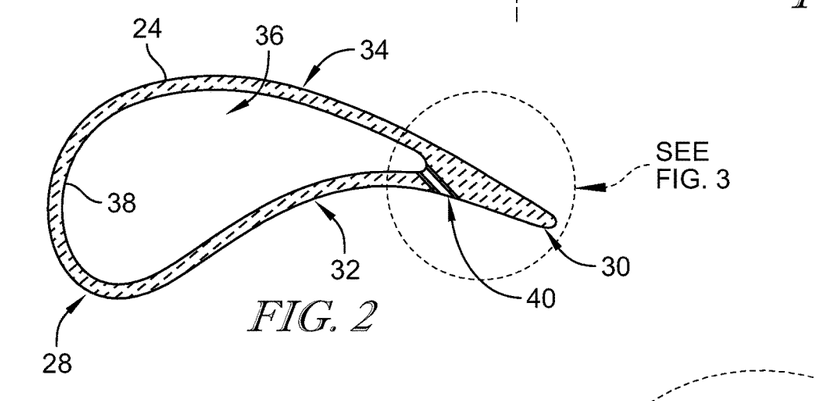
FIG. 2 is a cross section of the airfoil taken along line 2-2 in FIG. 1 showing that the airfoil is made from ceramic matrix composite materials and includes an outer surface shaped to interact with gases flowing through a gas path of the gas turbine engine and an inner surface defining a cooling cavity within the airfoil and showing one of the cooling passageways extending from the inner surface to the outer surface to direct cooling fluid from cooling cavity to the gas path of the gas turbine engine to cool the trailing edge of the airfoil.
Figure 3:
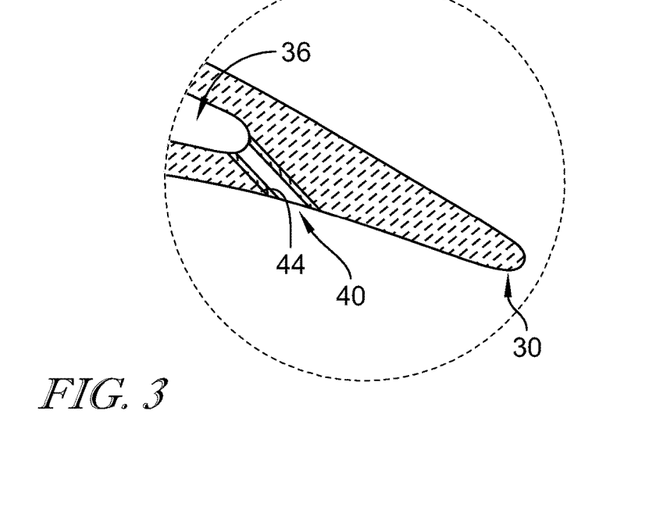
FIG. 3 is an enlarged view of the airfoil shown in FIG. 2 showing that the cooling passageway is defined by a tube that is made from an environmental barrier material that is embedded into the ceramic matrix composite airfoil during manufacture of the nozzle guide vane.

An illustrative nozzle guide vane 10 for use in a gas turbine engine is shown in FIG. 1. The nozzle guide vane 10 includes an outer endwall 12, an inner endwall 14 spaced apart from the outer endwall 12, and an airfoil 16 extending between the outer endwall 12 and the inner endwall generally along an axis 18 as shown in FIGS. 1 and 2. The outer endwall 12 and the inner endwall 14 are spaced apart axially from one another relative to the axis to define a gas flow path 20 therebetween. The airfoil 16 has an outer surface 24 shaped to interact with gases flowing through the gas flow path 20 and direct the gases toward rotating blades (not shown) to increase efficiencies of the gas turbine engine.

The airfoil 16 has a leading edge 28, a trailing edge 30, a pressure side 32, and a suction side 34 and is formed to include an airfoil shaped cooling cavity 36 defined by an inner surface 38 of the airfoil 16 as shown in FIG. 2. The airfoil 16 is also formed to include a plurality of cooling passages 40 that extend aft from the cooling cavity 36 generally through the trailing edge 30 to conduct a cooling fluid from the cooling cavity 36 through the airfoil 16 to the gas flow path 20. The cooling fluid exits the cooling passages 40 into the gas flow path 20 to provide a film of cooling fluid along the outer surface 24 of the airfoil 16 to cool the vane 10.

The vane 10 may be subjected to very high temperatures by virtue of being downstream of a combustor included in the gas turbine engine. In the illustrative embodiment, the vane 10 is made from ceramic matrix composite materials to guard against the high temperatures and increase durability and useful life of the vane 10. The ceramic matrix composite (CMC) materials forming the vane 10 may include a silicon carbide fiber preform embedded in silicon carbide matrix material. In other embodiments, another suitable CMC may be used. The ceramic fiber preform may include a plurality of reinforcement fibers 42 that are two-dimensionally or three-dimensionally woven or braided together as shown in FIGS. 4 and 5.

Figure 4:
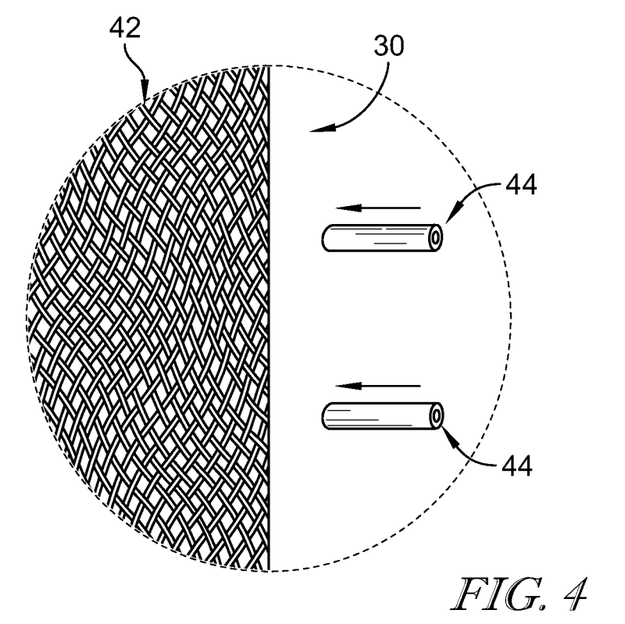
FIG. 4 is an enlarged perspective view of the airfoil during a preforming stage of manufacturing the nozzle guide vane showing that the ceramic matrix composite material forming the airfoil include a plurality of woven or braided reinforcement fibers and showing a pair of rigid environmental barrier tubes preparing to be embedded in the plurality of reinforcement fibers.
Figure 5:
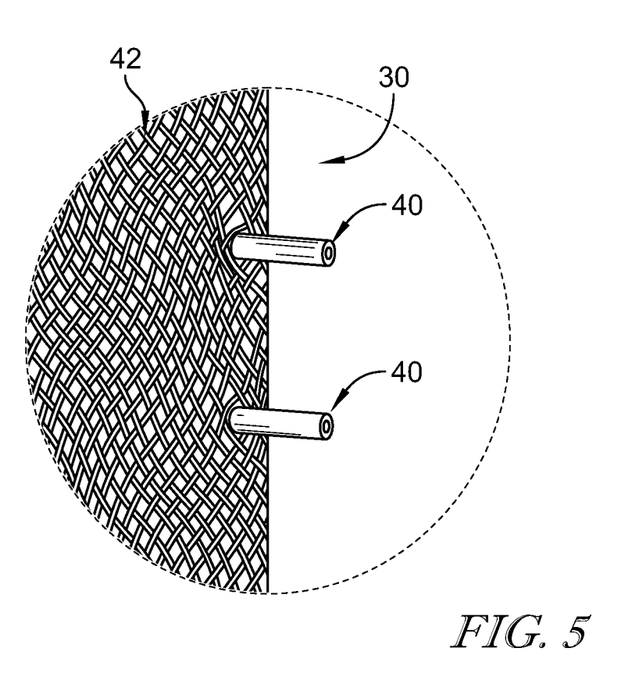
FIG. 5 is an enlarged perspective view similar to FIG. 4 showing the environmental barrier tubes being embedded into the plurality of reinforcement fibers forming the airfoil and the plurality of reinforcement fibers moving away from the tubes so that fiber fractures are avoided during formation of the airfoil with the cooling holes.

Prior to being infiltrated with ceramic matrix material, the plurality of reinforcement fibers 42 are movable relative to one another as suggested in FIGS. 4 and 5. The cooling passages 40 in the illustrative embodiment are formed prior to the ceramic fiber preform being processed with ceramic matrix material by inserting hollow tubes 44 into the ceramic fiber preform. The tubes 44 are already sintered to full density at this point in time such that they are rigid tubes. The fibers 42 are moved out of the way as the tubes 44 are embedded in the ceramic fiber preform to avoid fracturing any of the fibers 42. Fracturing or breaking fibers 42 may compromise the airfoil's 16 structural integrity. In other embodiments, passages may be machined in the airfoil 16 during a preforming stage and the tubes 44 may be inserted into the machined passages. Once the tubes 44 are embedded in the ceramic preform, the airfoil 16 may be infiltrated with the ceramic matrix material to densify the fiber preform and form the CMC airfoil 16. In illustrative embodiments, the tubes 44 are not densified by the ceramic matrix material. Some suitable densification processes include polymer infiltration, pyrolysis, chemical vapor infiltration, slurry infiltration, and/or melt infiltration.

Figure 6:
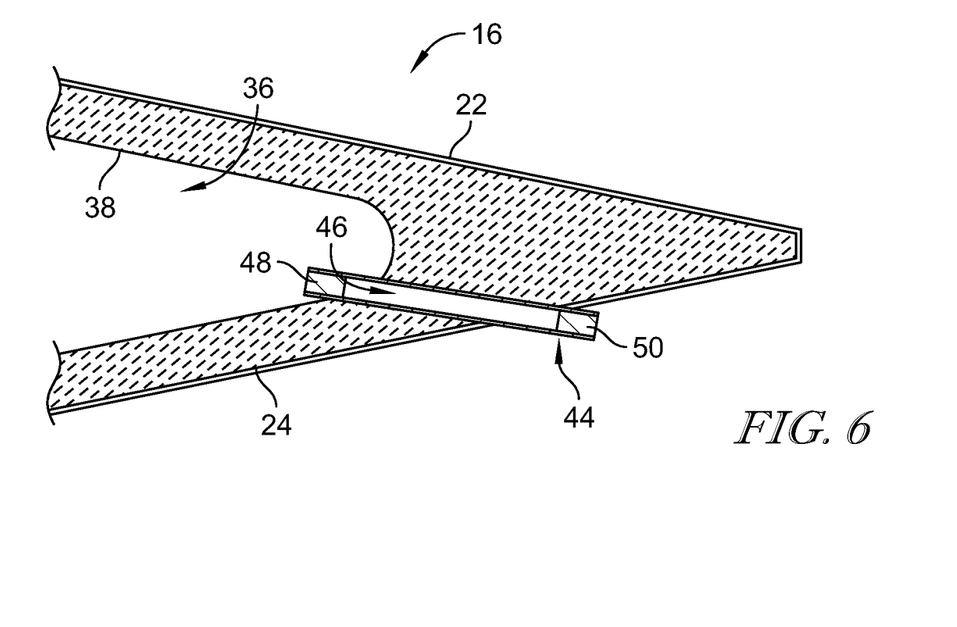
FIG. 6 is an enlarged cross-section view of the trailing edge of the airfoil after the tubes have been embedded in the plurality of reinforcement fibers and the reinforcement fibers have been infiltrated with ceramic matrix material to form a ceramic matrix composite airfoil showing that the tube is closed at each end to block ceramic matrix material from entering a passageway defined by the tube during infiltration of the airfoil.
Figure 7:
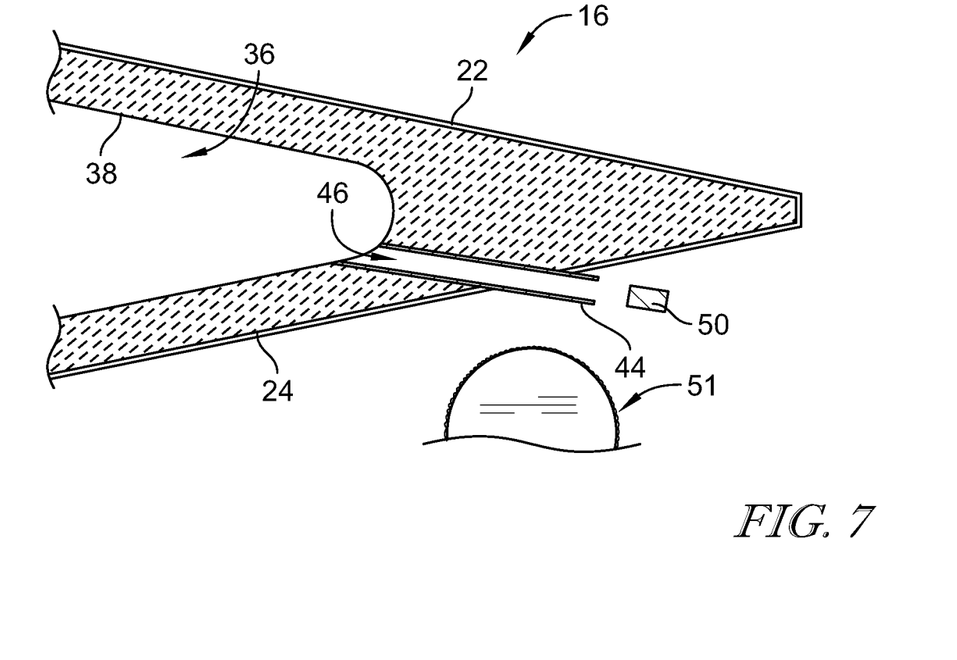
FIG. 7 is an enlarged cross-section view similar to FIG. 6 showing the tube with one of its ends removed to open the passageway after the airfoil has been full processed and a diamond wheel grinder preparing to machine the other end of the tube so that the tube is flush with the inner and outer surfaces of the airfoil and the cooling passageway is formed.

In use, some CMC components are vulnerable to recession caused by reaction of silica, which may be formed upon exposure to high temperatures, with water vapor, which may be present in the hot gases as a result of fuel combustion in the combustor. An environmental barrier coating (EBC) 22 may be applied to an outer surface 24 of the airfoil to block this reaction and, hence, the recession of the vane 10 from occurring as shown in FIGS. 6 and 7. The EBC coating 22 may be applied using an air plasma spray technique, Electrophoretic deposition (EPD), slurry cast, or oxide reaction bonding.

The cooling passages 40 in the illustrative embodiment have a relatively small diameter and a relatively high aspect ratio (i.e. the tube's length compared to the tube's diameter). In the illustrative embodiment, each cooling passage 40 has a width equal to about 1 mm and an aspect ratio that is greater than or equal to about 20. Cooling passages 40 of this diameter may be too small to receive the EBC coating 22, leaving the surfaces of the airfoil 16 defining the passages 40 devoid of EBC material and vulnerable to recession. As such, the tubes 44 in the illustrative embodiment are also made from an environmental barrier material and line the surfaces defining the cooling passages 40 to block recession of those areas.

The environmental barrier material forming the tubes 44 is a different material than the ceramic materials forming the airfoil 16 and is at least partially solidified and/or densified to form the hollow tubes 44. Illustratively, the tubes 44 are fully solidified and/or densified by sintering, for example. In this way, the tubes 44 are rigid and self-supporting and can be inserted in to the fibers 42 during the preforming stage of the airfoil 16 as shown in FIGS. 4 and 5. The tubes 44 may be formed by extrusion prior to being solidified. In one embodiment, the tubes 44 are strengthened with a fugitive polymer for handling purposes. In another embodiment, the tubes 44 may be strengthened with a removable filler such as, for example, a closed-cell carbonaceous material which is resistant to ceramic matrix infiltration in subsequent manufacturing processes. Since the tubes 44 are fully dense, they have a higher thermal conductivity than an EBC material that is applied by air plasma spray.

In the illustrative embodiment, the tubes 44 are capped at both ends to form a hollow tube passageway 46 that is closed off to prevent the tubes from being clogged with ceramic matrix material during densification of the ceramic fiber preform as shown in FIG. 6. The tubes 44 may include removable plugs 48, 50 disposed at both ends of the tube 44 to maintain the hollow tube passageway 46 during infiltration of the fibers 42 with ceramic matrix material. In another embodiment, the environmental barrier material forming the tubes 44 may provide and define both ends to close off the hollow tube passageway 46 without the plugs 48, 50. In other words, the tubes 44 may be formed fully of environmental barrier material with solid ends and a hollow pocket in the midsection. Once embedded in to the fibers 42, the preform of the airfoil is processed further with the tubes 44 to form the ceramic matrix composite airfoil 16 with cooling passages 40. The processing may include machining, cutting, removing the plugs 48, 50, burning, or any other suitable material for removing material and/or exposing the hollow midsection of the tube 44.

The airfoil 16 shown in FIG. 6 has completed all ceramic matrix infiltration steps and the tube 44 of environmental barrier material lines the cooling passage 40 to block recession in this area. The ceramic matrix material also fills any gaps formed between the fibers 42 and the embedded tubes 44. At this point, the plugs 48, 50 and/or the ends of the tubes 44 may be removed to open the hollow tube passages 46. If the ends of the tubes 44 extend past the outer surface 24 and/or the inner surface 38, the tubes 44 may be machined off so that they are flush with the outer surface 24 and the inner surface 38 as shown in FIG. 7. A tool 51 may be used to remove (i.e. by grinding) the ends of the tubes 44 off until ends of the tubes 44 are flush with the outer and inner surfaces 24, 38 of the airfoil 16. The cutting tool 51 may include a diamond cutting wheel or another suitable cutting and/or material removing tool.

Forming the airfoil 16 with cooling passages 40 using the hollow tubes 44 made from densified environmental barrier material as described above allows the cooling passages 40 to be sized to optimize cooling of the airfoil 16. For example, airfoils formed without the tubes 44 may have cooling holes machined through the airfoil using a typical spiral drill bit, a diamond core drill or burr, or a laser. Typical spiral drill bits form cylindrical passages with a constant cross-sectional area. Drilling may also cause fracturing and/or forming/exposing terminal ends of the fibers. Even if coated with a barrier coating at a later stage, the formed and exposed terminal ends may not be as desired as intact fibers that are parted around the tubes 44 to form the passages 40.

Figure 8:
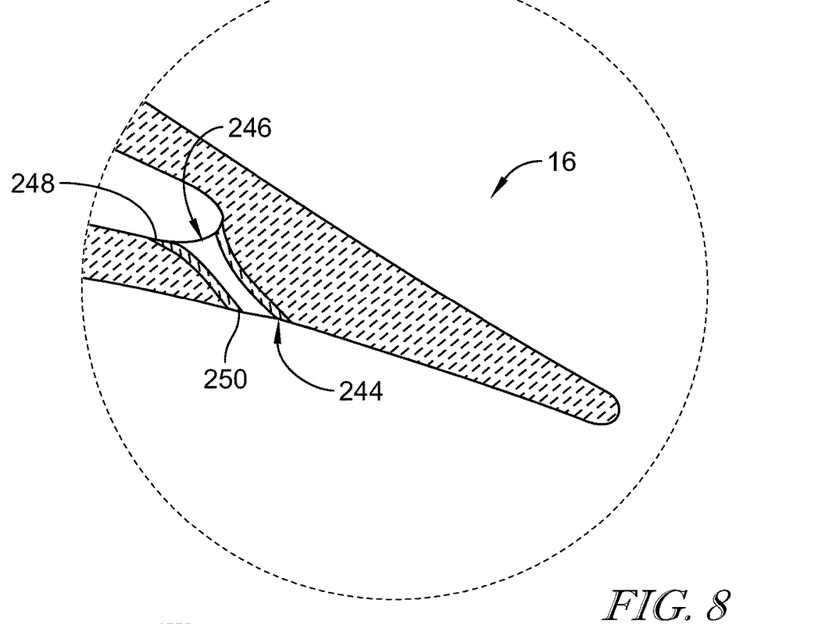
FIG. 8 is an enlarged cross-section view of an airfoil with another embodiment of a tube embedded in the airfoil to provide a cooling passageway with a varying cross-sectional area that decreases along a length of the tube from a first end to a second end.
Figure 9:
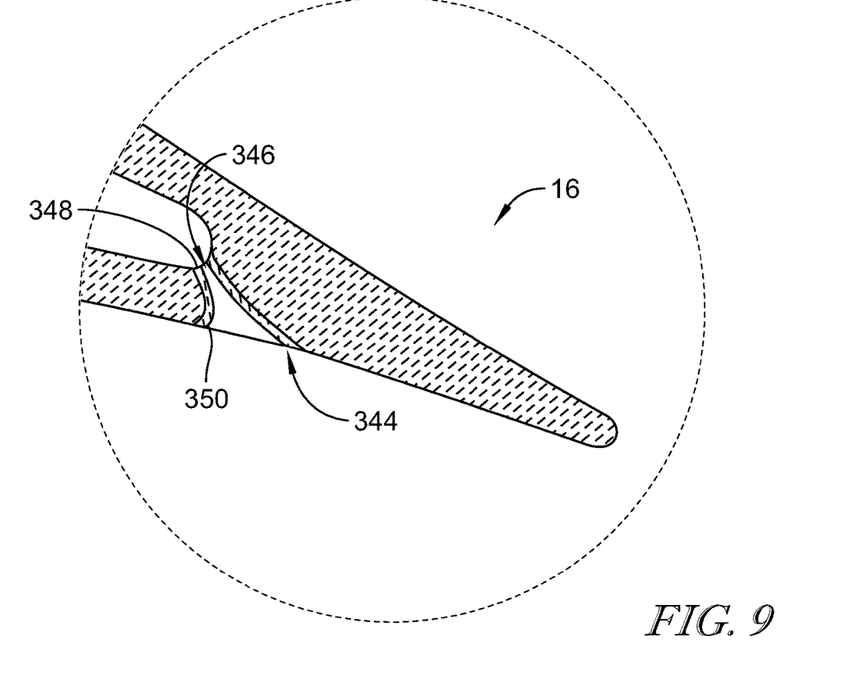
FIG. 9 is an enlarged cross-section view of an airfoil with a third embodiment of a tube embedded in the airfoil to provide a cooling passageway with a varying cross-sectional area that increases along a length of the tube from a first end to a second end.
Figure 10:
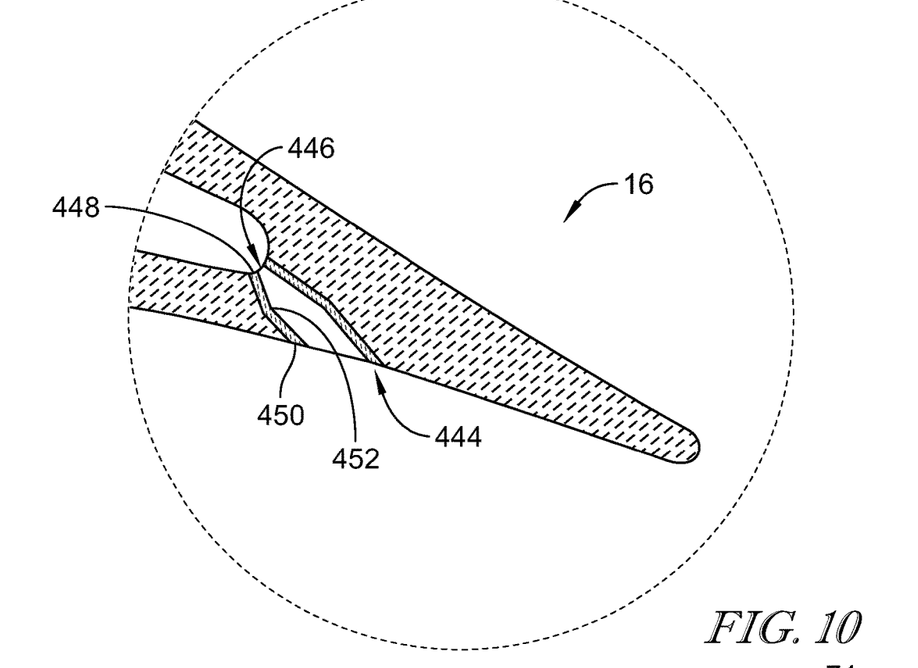
FIG. 10 is an enlarged cross-section view of an airfoil with a fourth embodiment of a tube embedded in the airfoil to provide a cooling passageway with a varying cross-sectional area that increases from a first end of the tube to a point between the first end and a second end and decreases from the point to the second end.

The tubes 44 in the illustrative embodiment may be formed to have a passage 46 with a varying cross-sectional area, as shown in FIGS. 8-10, because they are formed without any drilling or machining through the airfoil 16. Varying the cross-sectional area of the passage 46 may change the cooling fluids flow profile through the passage 46 to optimize properties of the cooling fluid such as, for example, flow rate, pressure, and/or heat transfer and minimizing interaction losses with the primary flow through the gas flow path 20.

A second embodiment of a tube 244 made from densified environmental barrier material and embedded in the airfoil 16 during the preforming stage is shown in FIG. 8. The tube 244 is formed to include a hollow passage 246 that extends from a first end 248 to a second end 250 defining a total length of the tube 244. The hollow passage 246 has a cross-sectional area that decreases or narrows from the first end 248 to the second end 250. As such, the hollow passage 246 acts as a nozzle. The cross-sectional area of the hollow passage 246 may decrease constantly from the first end 248 to the second end 250 such that the surfaces defining the passage 246 have a linear or exponentially changing slope.

A third embodiment of a tube 344 made from densified environmental barrier material and embedded in the airfoil 16 during the preforming stage is shown in FIG. 9. The tube 344 is formed to include a hollow passage 346 that extends from a first end 348 to a second end 350 defining a total length of the tube 344. The hollow passage 346 has a cross-sectional area that increases or expands from the first end 348 to the second end 350. As such, the hollow passage 346 acts as a diffuser. The cross-sectional area of the hollow passage 346 may increase constantly from the first end 348 to the second end 350 such that the surfaces defining the passage 346 have a linear or exponentially changing slope.

A fourth embodiment of a tube 444 made from densified environmental barrier material and embedded in the airfoil 16 during the preforming stage is shown in FIG. 10. The tube 444 is formed to include a hollow passage 446 that extends from a first end 448 to a second end 450 defining a total length of the tube 444. The hollow passage 446 has a cross-sectional area that increases from the first end to a point 452 between the first end 448 and the second end 450 and decreases from the point 452 to the second end 450. As such, the hollow passage 446 has a diffuser and then a nozzle like profile. The cross-sectional area of the hollow passage 446 may vary constantly from the first end 448 to the point 452 and from the point 452 to the second end 450 such that the surfaces of the passage 446 have a linear or exponentially changing slope.

Figure 11A:
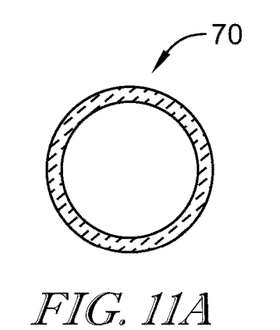
FIG. 11A is a cross section of a tube with a circular shape.
Figure 11B:
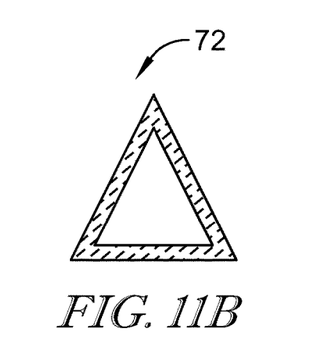
FIG. 11B is a cross section of a tube with a triangular shape.
Figure 11C:
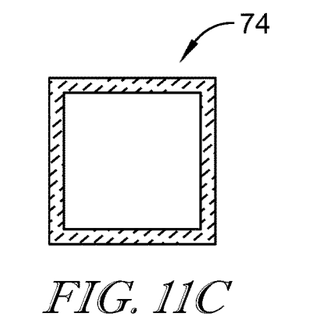
FIG. 11C is a cross section of a tube with a square shape.
Figure 11D:
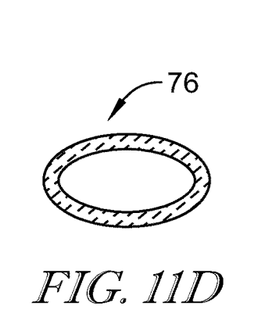
FIG. 11D is a cross section of a tube with an oval shape.
Figure 11E:
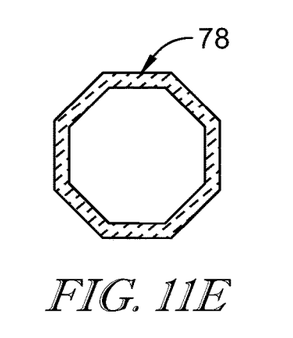
FIG. 11E is a cross section of a tube with a polygonal shape.
Figure 11F:
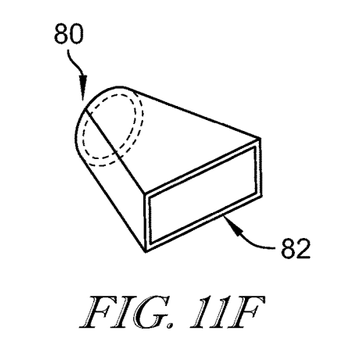
FIG. 11F is a perspective view of a tube with a circular shape at a first end that transitions to a rectangular shape at a second end.

Any of the tubes 44, 244, 344, 444 in the illustrative embodiment may have a circular or a non-circular cross-sectional shape as shown in FIGS. 11A-11E. In one embodiment, the tubes 44, 244, 344, 444 may have a circular cross-sectional shape 70 as shown in FIG. 11A. In another embodiment, the tubes 44, 244, 344, 444 may have a triangular cross-sectional shape 72 as shown in FIG. 11B. In another embodiment, the tubes 44, 244, 344, 444 may have a square or rectangular cross sectional shape 74 as shown in FIG. 11C. In another embodiment, the tubes 44, 244, 344, 444 may have an oval cross-sectional shape 76 as shown in FIG. 11D. In other embodiments, the tubes 44, 244, 344, 444 may have any polygonal cross-sectional shape which is represented by the octagonal cross-sectional shape 78 as shown in FIG. 11E. In another embodiment, the tubes 44, 244, 344, 444 may have a first cross sectional shape (i.e. a circular shape) at a first end 80 and a second cross sectional shape (i.e. a rectangular shape) different than the first shape at a second end 82 as shown in FIG. 11F. In another embodiment, the tubes 44, 244, 344, 444 may have an oval cross-sectional shape 76 as shown in FIG. 11D. Typical spiral drill bits or diamond core drills or burrs used to drill passages in airfoils or other components in the gas turbine engine may not be able to form the non-circular cross-sectional shapes described above and may leave the surfaces of the passages devoid of environmental barrier material.

Figure 12:
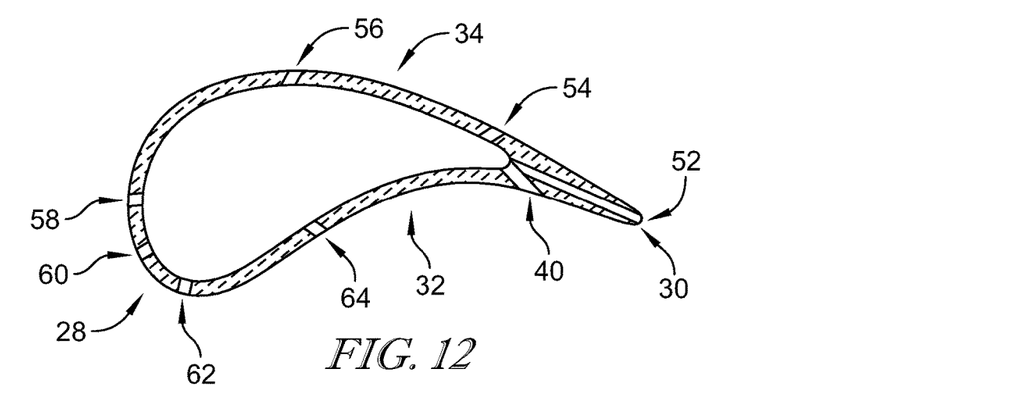
FIG. 12 is a cross-section of an airfoil illustrating various locations in the airfoil where the cooling passageways may be formed.

Although the cooling passages 40 shown in FIGS. 1-9 are formed through the trailing edge 30 of the airfoil 16 and open along the pressure side 32 of the airfoil 16, other cooling passages may be formed in other locations of the airfoil as shown in FIG. 12. Such passages are formed using the same process and any of the environmental barrier tubes 44, 244, 344, 444 described above. A second cooling passage 52 may be formed to extend through the trailing edge 30 and exit directly at the trailing edge 30. A third cooling passage 54 may extend aft from the cooling cavity 36 at the trailing edge 30 and exit along the suction side 34. A fourth cooling passage 56 may be spaced apart from the trailing edge 30 and extend from the cooling cavity 36 and exit along the suction side 34. A fifth cooling passage 58 may be formed at the leading edge 28 and extend forward from the cooling cavity 36 and exit along the suction side 34. A sixth cooling passage 60 may be formed at the leading edge 28 and extend forward from the cooling cavity and exit directly at the leading edge 28. A seventh cooling passage 62 may be formed at the leading edge 28 and extend forward from the cooling cavity 36 and exit along the pressure side 32. An eighth cooling passage 64 may be spaced apart from the leading edge 28 and the trailing edge 30 and extend from the cooling cavity 36 and exit along the pressure side 32. Other arrangements and locations of cooling passages in the airfoil 16 may also be used.

Figure 13:
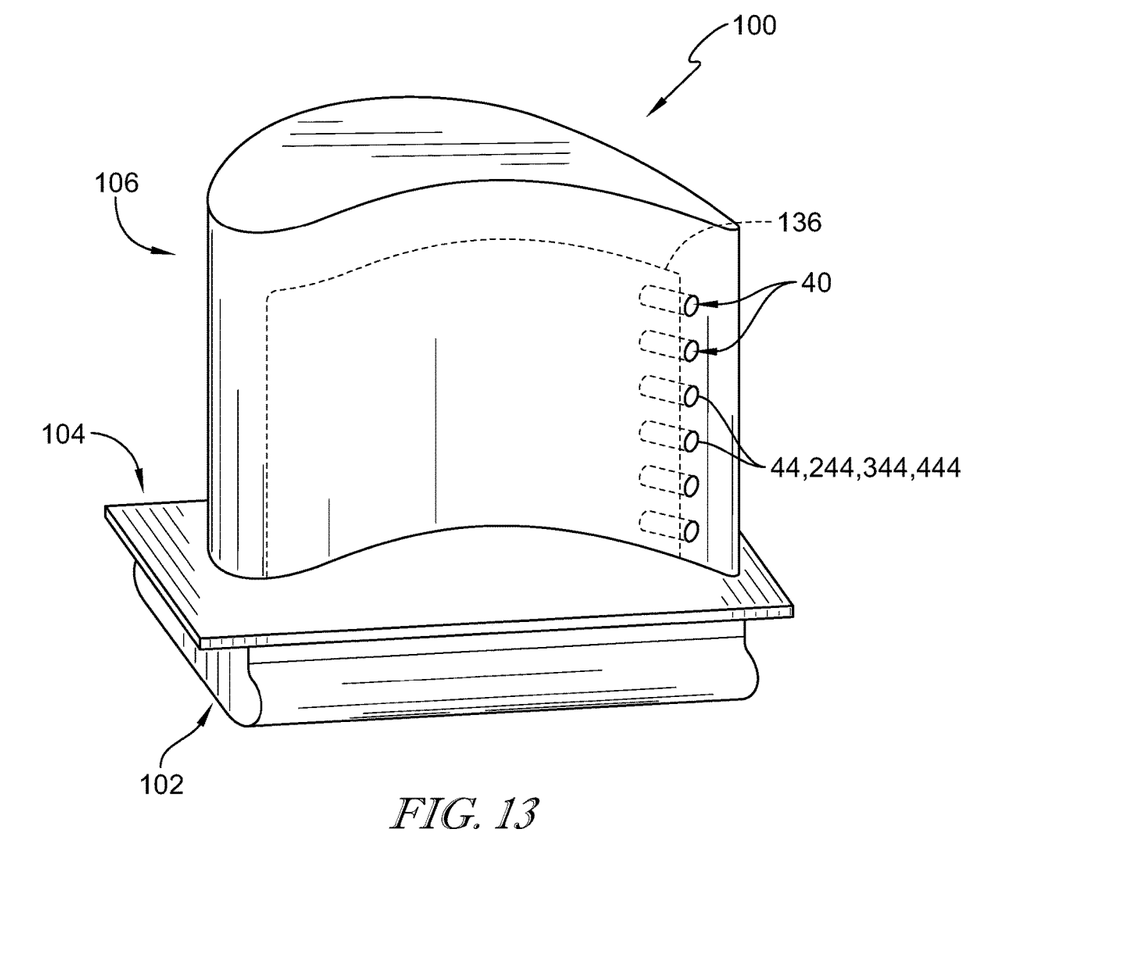
FIG. 13 is a perspective view of a blade for use in a gas turbine engine, the blade including a root, a platform, and an airfoil with cooling passageways formed in the airfoil using the tubes made from the environmental barrier material.

Any of the tubes 44, 244, 344, 444 described above may also be used in other CMC components to provide cooling passages 40. For example, the tubes 44, 244, 344, 444 may be included in a turbine blade 100 as shown in FIG. 13. The turbine blade 100 illustratively includes a root 102, a platform 104, and an airfoil 106. The root 102 is sized and shaped to attach the blade 100 to a turbine disk (not shown) for rotation about a central axis of a gas turbine engine. The platform 104 provides a radial boundary for a gas flow path. The airfoil 106 extends into the gas flow path and interacts with hot gases which cause the turbine blade, and the disk to rotate about the central axis. The airfoil 106 is similar to airfoil 16 in vane 10 and is formed with cooling passages 40 provided by the tubes 44, 244, 344, 444 as shown in FIG. 13. The cooling passages 40 extend from a cooling cavity 136 in the airfoil 106 to conduct cooling fluid from the cavity 136 to the gas flow path.

In other airfoils, cooling holes may be made in an airfoil by CVD diamond coated conventional twist drills, ultrasonically assisted diamond drilling, or laser drilling. However, some portions around the cooling holes may be unprotected by EBC on the machined surfaces which may lead to life concerns. Additionally, such machining processes may be challenging due to material heterogeneity. Forming holes or passages in situ with the preform, in accordance with the present disclosure, also avoids drill/spindle breakage. In some embodiments, the trailing edge of a CMC vane may be difficult to cool due to the relatively long distance (perhaps ⅓ of the airfoil chord) between the internal passage or cavity within the vane and the trailing edge. Cooling holes may be an attractive option to create a film of relatively cool air to protect the trailing edge. Silicon carbide CMCs may be vulnerable to recession caused by reaction of the surface silica (that forms on exposure to high temperatures) with water vapour (present in the environment or introduced as a result of combustion). An environmental barrier coating (EBC) may be applied to the surface of the CMC by techniques such as air plasma spray to address this issue but may not work inside cooling holes which have a diameter around 1 mm and a high aspect ratio (>20).

Accordingly, the present disclosure includes inserting a hollow tube made of the environmental barrier material (typically a rare earth (RE) silicate, for example, in the form of $RE_2SiO_5$ or $RE_2Si_2O_7$ where RE comprises at least one of yttrium, ytterbium, erbium, lutetium, europium, terbium, neodymium, praseodymium, dysprosium, or any other suitable rare earth element) into the CMC at the preforming stage. The tube may stick out of the preform outside and inside the airfoil and remain in place through the subsequent densification process steps which may include boron nitride and/or silicon carbide chemical vapour infiltration (CVI), slurry infiltration, and/or melt infiltration. This may have an additional component cooling benefit in increasing local heat transfer coefficient, i.e. act as a turbulator. To prevent ingress of infiltration materials, end plugs made of suitable refractory material may be employed and removed after final densification process steps are complete. In some embodiments, the plugged ends of the tube may be removed by employing a localized diamond cutting wheel to leave the correct internal and external profile of the airfoil. The ends of the tube may also be removed by oxidation or chemical leaching depending on materials used.

In some embodiments, the EBC tube is first strengthened for handling purposes with fugitive or removable filler which could also act as a plug to prevent infiltration. A closed cell carbonaceous material is one example of such a filler. The tube could be manufactured by extrusion. The EBC tube in the illustrative embodiment may be fully dense and therefore have a higher thermal conductivity than EBC which is typically applied to the external surface of a component by air plasma spray. This may be an advantage for lining a cooling hole.

In some embodiments, the EBC tube may not have a constant cross-section which may offer improve aerodynamic and cooling performance through more accurately matching the free-stream fluid behavior at the hole exit. In some embodiments, the tubes provide environmental protection from cooling flow passing through the CMC structure. In some embodiments, the tubes may be relatively simple to create and apply to the CMC pre-form (i.e. opportunity to mass produce or automate the process). In some embodiments, the tube may provide opportunity for very tight internal tube dimensional tolerances (i.e. very good for cooling flow performance and reducing uncertainty on coolant consumption).

In some embodiments, an exposed SiC surface (especially one which includes sources of boron) may form a silica glass layer at elevated temperatures. This may create blockage or partial blockage in the bore of the cooling hole. A rare earth silicate EBC lining to the cooling hole may reduce or eliminate this effect as it will not tend to form a glassy layer. In some embodiments, a ratio of Rare Earth monosilicates to disilicates can be tailored to optimize the environmental resistance, recession tolerance, and likelihood of de-bonding the EBC tube from the CMC structure. Tailoring the ratio of monosilicate to disilicate may also allow optimization of resistance to CMAS (calcium magnesium aluminosilicate) and coefficient of thermal expansion mismatch.

In some embodiments, the CMC vanes offer cooling flow and consequent fuel burn reductions in gas turbine engines. The cooling holes may be applicable to all gas turbines which utilize high overall pressure ratio (OPR)/high turbine entry temperature (TET) to obtain high thermal efficiency. In some embodiments, the in situ EBC for cooling holes could be applied to other hot end gas turbine components made from SiC/SiC CMCs.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A method comprising
providing an airfoil shaped ceramic reinforcement fiber preform and a tube, the ceramic reinforcement fiber preform having a first side formed to define a cooling cavity in the ceramic reinforcement fiber preform and a second side opposite the first side, the tube being made from an environmental barrier material and having a first end and a second end,
inserting the tube through the ceramic reinforcement fiber preform so that the first end of the tube extends into the cooling cavity and the second end of the tube extends beyond the second side of the ceramic reinforcement fiber preform,
infiltrating the ceramic reinforcement fiber preform with ceramic matrix material to densify the ceramic reinforcement fiber preform and form a ceramic matrix composite airfoil having the tube fixed therein, the ceramic matrix composite airfoil having an inner surface that defines the cooling cavity and an outer surface opposite the inner surface and adapted to interface with hot gases, and
removing material from the first end and the second end of the tube such that the first end is about flush with the inner surface and the second end is about flush with the outer surface to form a cooling passage with the tube that extends through the ceramic matrix composite airfoil to provide fluid communication between the cooling cavity and environment surrounding the outer surface outside of the ceramic matrix composite airfoil,
wherein the tube includes a central hollow section,
wherein the first end is made of solid material and the second end is made of solid material to block ingress of ceramic matrix composite material into the hollow section during the infiltrating step, and
wherein the solid material is environmental barrier material.

2. The method of claim 1, wherein the step of removing material from the first end and the second end includes cutting the first end from the tube to form a first opening into the hollow section and cutting the second end from the tube to form a second opening into the hollow section.

3. The method of claim 1, wherein the tube includes an inner surface that directly defines the cooling passage and an outer surface that directly engages the ceramic matrix composite airfoil and the environmental barrier material extends between the inner surface and the outer surface of the tube.

4. The method of claim 1, wherein the step of inserting the tube through the ceramic reinforcement fiber preform includes parting fibers included in the ceramic reinforcement fiber preform around the tube to avoid fracturing the fibers.

5. The method of claim 1, further comprising:
sintering the tube to full density before inserting the tube through the ceramic reinforcement fiber preform such that the tube is a rigid tube.

6. The method of claim 1, further comprising:
machining a passage in the ceramic reinforcement fiber preform before the step of inserting the tube through the ceramic reinforcement fiber preform,
wherein the step of inserting the tube through the ceramic reinforcement fiber preform includes inserting the tube through the passage.

7. The method of claim 5, further comprising:
forming the tube by extrusion prior to sintering.

* * * * *